United States Patent
Ghosh et al.

(10) Patent No.: US 10,796,320 B2
(45) Date of Patent: Oct. 6, 2020

(54) SYSTEMS AND METHODS FOR PASSIVELY DETERMINING A RATIO OF PURCHASERS AND PROSPECTIVE PURCHASERS IN A MERCHANT LOCATION

(71) Applicant: MasterCard International Incorporated, Purchase, NY (US)

(72) Inventors: Debashis Ghosh, Charlotte, NC (US); Randy Shuken, Westport, CT (US); Mary Elizabeth Lesbirel, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 182 days.

(21) Appl. No.: 14/138,342

(22) Filed: Dec. 23, 2013

(65) Prior Publication Data
US 2015/0178739 A1    Jun. 25, 2015

(51) Int. Cl.
*G06Q 30/02* (2012.01)
*H04W 64/00* (2009.01)
*H04W 4/029* (2018.01)
*H04W 4/80* (2018.01)
*H04W 4/02* (2018.01)

(52) U.S. Cl.
CPC ........ *G06Q 30/0201* (2013.01); *H04W 4/029* (2018.02); *H04W 64/00* (2013.01); *H04W 4/023* (2013.01); *H04W 4/027* (2013.01); *H04W 4/80* (2018.02)

(58) Field of Classification Search
CPC ... G06Q 30/0201; G06Q 30/00; H04W 4/029; H04W 64/00; H04W 4/80; H04W 4/023; H04W 4/027
USPC .................................................. 705/7.29
See application file for complete search history.

(56) References Cited

U.S. PATENT DOCUMENTS

| 3,808,410 | A | * | 4/1974 | Schlesinger | G06Q 10/06 377/20 |
|---|---|---|---|---|---|
| 6,563,423 | B2 | * | 5/2003 | Smith | G08B 13/2445 340/572.1 |
| 6,788,202 | B2 | * | 9/2004 | Holmes | G06Q 30/06 340/12.18 |
| 7,116,985 | B2 | | 10/2006 | Wilson et al. | |
| 7,181,227 | B2 | | 2/2007 | Wilson et al. | |
| 7,190,960 | B2 | | 3/2007 | Wilson et al. | |

(Continued)

OTHER PUBLICATIONS

New insights into retail space and format planning from customer-tracking data, Andrew J. Newman, Daniel K.C. Yu, David P. Oulton, Journal of Retailing and Consumer Services, (2002), pp. 253-258 (Year: 2002).*

*Primary Examiner* — Timothy Padot
*Assistant Examiner* — Darlene Garcia-Guerra
(74) *Attorney, Agent, or Firm* — Armstrong Teasdale LLP

(57) ABSTRACT

A method and system for determining a status of a visitor to a physical location and associated with a handheld device using a computer device coupled to a database are provided. The method includes receiving, by the processor, a hello message from a radio associated with one or more handheld devices, capturing a unique identifier of the handheld device from the received hello message, determining visitor geographic information based on the captured unique identifier and a determined signal strength of the hello message, and outputting the visitor information.

17 Claims, 7 Drawing Sheets

(56) References Cited

U.S. PATENT DOCUMENTS

| | | | |
|---|---|---|---|
| 7,203,502 B2 | 4/2007 | Wilson et al. | |
| 7,415,510 B1* | 8/2008 | Kramerich | G06Q 30/02 705/13 |
| 7,450,954 B2 | 11/2008 | Randall | |
| 9,740,977 B1* | 8/2017 | Moon | G06Q 30/02 |
| 2004/0125753 A1* | 7/2004 | Mahany | H04L 1/0002 370/254 |
| 2005/0015299 A1* | 1/2005 | Sisserian | G06Q 30/02 705/14.38 |
| 2006/0020497 A1 | 1/2006 | McNally | |
| 2006/0200378 A1* | 9/2006 | Sorensen | G06Q 10/063 705/7.29 |
| 2008/0074264 A1* | 3/2008 | Sharpe | H04L 67/20 340/572.1 |
| 2008/0147461 A1* | 6/2008 | Lee | G01C 21/206 705/7.34 |
| 2008/0154673 A1* | 6/2008 | Connolly | G06Q 10/06312 705/7.22 |
| 2008/0239073 A1* | 10/2008 | Ruohonen | G07C 9/00 348/143 |
| 2008/0294487 A1* | 11/2008 | Nasser | G06Q 30/02 705/7.32 |
| 2009/0154398 A1* | 6/2009 | Isozu | H04W 84/18 370/328 |
| 2009/0217315 A1* | 8/2009 | Malik | G06K 9/00362 725/9 |
| 2009/0326807 A1* | 12/2009 | Ramaswamy | H04L 67/12 701/408 |
| 2010/0184454 A1* | 7/2010 | Luft | H04W 48/02 455/456.5 |
| 2011/0028160 A1* | 2/2011 | Roeding | G06Q 30/00 455/456.1 |
| 2011/0037571 A1* | 2/2011 | Johnson, Jr. | G06K 7/0095 340/10.5 |
| 2011/0106624 A1* | 5/2011 | Bonner | G06Q 30/0261 705/14.58 |
| 2011/0238361 A1* | 9/2011 | Ueki | G06Q 10/10 702/127 |
| 2011/0301832 A1* | 12/2011 | Zheng | G01C 21/3484 701/425 |
| 2012/0290383 A1* | 11/2012 | Busch | G06Q 30/02 705/14.36 |
| 2012/0330998 A1* | 12/2012 | Yacov | C12N 15/117 707/769 |
| 2013/0038490 A1* | 2/2013 | Garcia | G01S 13/74 342/451 |
| 2013/0184887 A1* | 7/2013 | Ainsley | G05B 15/02 700/291 |
| 2013/0191213 A1 | 7/2013 | Beck et al. | |
| 2013/0198376 A1* | 8/2013 | Landa | G06Q 10/04 709/224 |
| 2013/0217333 A1* | 8/2013 | Sprigg | H04W 4/008 455/41.2 |
| 2013/0246164 A1* | 9/2013 | Khanna | G06Q 30/0267 705/14.45 |
| 2013/0267253 A1* | 10/2013 | Case | H04W 4/021 455/456.3 |
| 2013/0293530 A1* | 11/2013 | Perez | G06K 9/00671 345/418 |
| 2014/0066098 A1* | 3/2014 | Stern | H04W 4/043 455/456.3 |
| 2014/0079282 A1* | 3/2014 | Marcheselli | G06K 9/00335 382/103 |
| 2014/0132728 A1* | 5/2014 | Verano | G06K 9/00771 348/46 |
| 2014/0136312 A1* | 5/2014 | Saksena | G06Q 30/0261 705/14.39 |
| 2014/0172489 A1* | 6/2014 | Goulart | G06Q 10/06312 705/7.22 |
| 2014/0201001 A1* | 7/2014 | Rellas | G06Q 30/0607 705/14.58 |
| 2015/0058049 A1* | 2/2015 | Shaw | G06Q 10/02 705/5 |

* cited by examiner

SYSTEMS AND METHODS FOR PASSIVELY DETERMINING A RATIO OF PURCHASERS AND PROSPECTIVE PURCHASERS IN A MERCHANT LOCATION

BACKGROUND

This disclosure relates generally to processing raw data and, more particularly, to computer systems and computer-based methods for passively using signals emitted from mobile devices to determine a ratio of purchasers and prospective purchasers in a merchant location, such as a bricks and mortar store location.

Merchant locations, such as, stores, may have many visitors passing through the store at any given time. Some visitors may be prospective customers, browsing, window-shopping, or comparing prices. Other visitors may be actual customers that ultimately complete a purchase during the visit to the store. A merchant would like to know how many of the visitors to his store are actually purchasing customers rather than simply visitors to the store. The currently available determination schemes do not provide enough information for the merchant to know how many of the visitors to his store are actually customers. Such information could be used to establish efficient store hours or employee work hours or distribution of employees in different departments in the store.

Accordingly, it would be desirable to provide a system and/or method for determining not only a number of visitors to the store, but also how many of the visitors actually make a purchase and their path and dwell time in certain areas of the store.

BRIEF DESCRIPTION

In one embodiment, a method for determining a status of a visitor to a physical location and associated with a handheld device is implemented using a computer including a processor communicatively coupled to a memory device and includes receiving, by the processor, a hello message from a radio associated with one or more handheld devices, capturing a unique identifier of the handheld device from the received hello message, determining visitor geographic information based on the captured unique identifier and a determined signal strength of the hello message, and outputting the visitor information.

In another embodiment, a computer system for processing data by a computer system including a memory device and a processor in communication with the memory device is programmed to receive a hello message from one or more handheld devices present in a predetermined location, determine a unique identification number associated with each of the one or more handheld devices based on the received hello message, determine visitor geographic information based on the determined unique identifier and a determined signal strength of the hello message, and output the visitor information.

In yet another embodiment, one or more non-transitory computer-readable storage media has computer-executable instructions embodied thereon, wherein when executed by at least one processor, the computer-executable instructions cause the processor to receive a hello message from one or more handheld devices present in a predetermined location, determine a unique identification number associated with each of the one or more handheld devices based on the received hello message, determine visitor geographic information based on the determined unique identifier and a determined signal strength of the hello message, and output the visitor information.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example system including a plurality of computer devices in accordance with one example embodiment of the present disclosure.

FIG. 3 is an expanded block diagram of an example embodiment of a server architecture of the system including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 illustrates a floor layout of a merchant location in accordance with an example embodiment of the present disclosure.

FIG. 7 is a flow diagram of a method of determining a status of a visitor to a physical location and associated with a handheld device.

DETAILED DESCRIPTION

Figure 1:
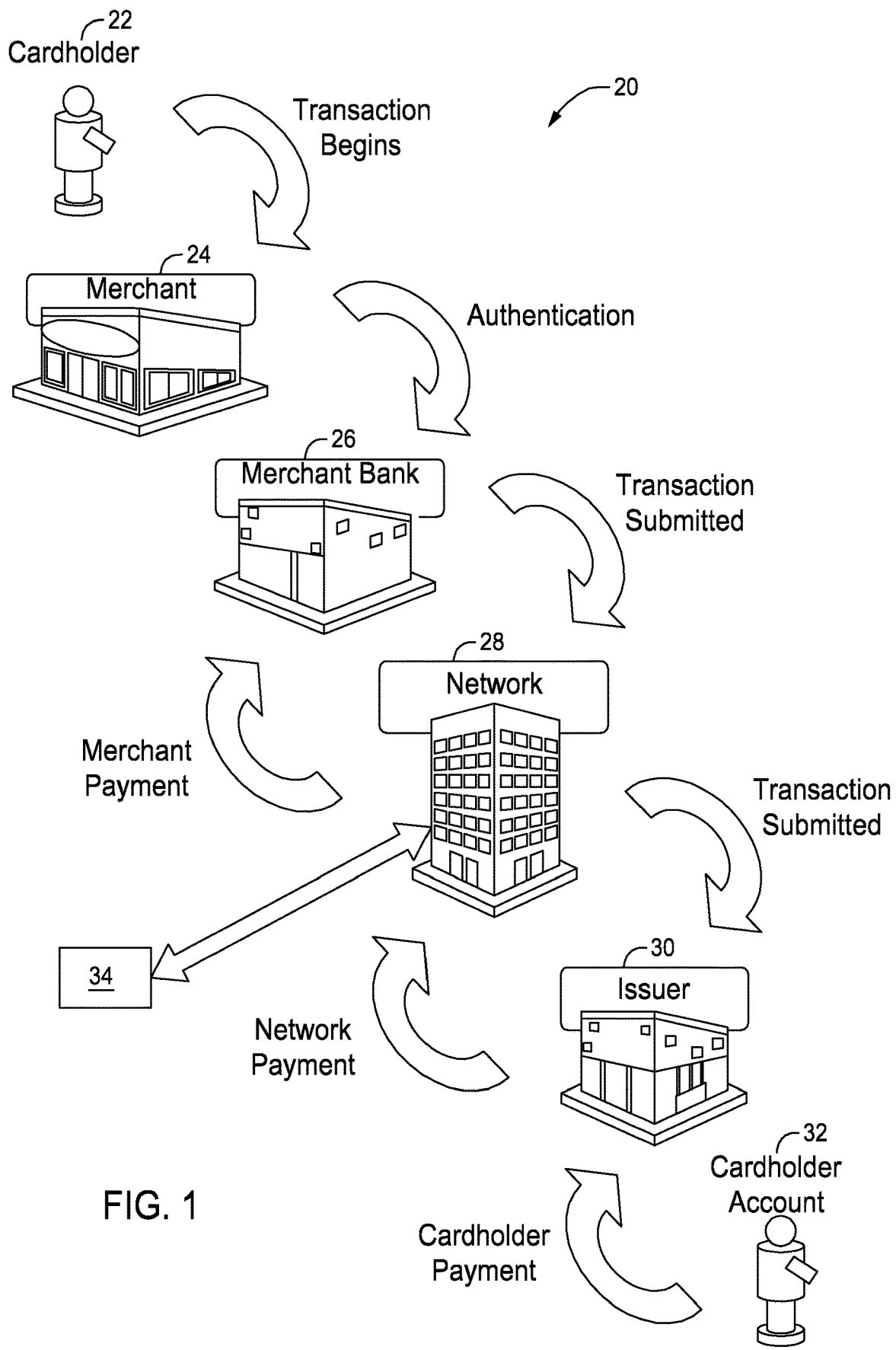
FIGS. 1-7 show example embodiments of the methods and systems described herein.

Embodiments of the methods and systems described herein relate to systems and methods of using signals emitted from mobile devices, such as, but not limited to, smartphones to determine a ratio of a number of visitors to a physical merchant location to a number of actual customers to the store. The visitors may be considered as window-shoppers until they make a purchase, at which time they are considered as customers. By using signals emitted from a smartphone trying to connect to a network and the intensity of the signals, a number of visitors, path of each visitor through the store, a dwell time of each visitor in certain locations of the store, and a proximity of each visitor to each other visitor are determinable. When not connected to a wireless network, with a smartphone's wireless transceiver turned on, the smartphone sends out interrogation signals attempting to locate and determine available networks. These wireless interrogations often include a unique identifier, such as, but not limited to a Media Access Control (MAC) address. A strength of these signals varies with a distance away from the transceiver and may be used to determine a relative distance between the transceiver and a receiver. One or more passive receivers may be positioned about a store and be used to receive these interrogations, which can then be input to a controller configured to use the interrogations to determine a position in the store and a path through the store. In this way, a number of visitors in the store at any time can be determined using the number of unique MAC addresses in the store. This data may also be integrated over time to determine a number of visits made by each MAC address, a length of stay in the store, and amount of the floor space covered by each visitor.

A number of purchasers may be determined using transaction data received by a service provider, such as, but not limited to a financial card interchange network. The transaction data may be correlated to the visitor in real-time to determine that the visitor is a purchaser or may be correlated to the transaction data at a later time using timestamps. Moreover, the ratio may be adjusted to account for purchasers that use cash or other means of payment where the transaction data is not available to the service provider.

The methods and systems described herein may be implemented using computer programming or engineering techniques including computer software, firmware, hardware or any combination or subset thereof, wherein the technical effect may include at least one of: (a) receiving a hello message from a radio associated with one or more handheld devices, (b) capturing a unique identifier of the handheld device from the received hello message, (c) determining a signal strength of the received hello message, (d) determining visitor geographic information based on the captured unique identifier and the determined signal strength, and (e) outputting the visitor information.

The hello message is a specialized data packet and is therefore also referred to as a "hello packet". The hello packet may contain information, such as the identity of the handheld device and a request to enter the wireless network as the handheld device seeks connections with base stations or scanning point devices within their respective RF transmission ranges. Intermediary devices may be used to re-broadcast the hello packet until the hello packet reaches all at least one of the scanning points.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a payment card network operated by MasterCard International Incorporated, the assignee of the present disclosure. The payment card network, as described herein, is a four-party payment card interchange network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network.

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In various embodiments, at least some of the resources used system 20 are embodied in a cloud environment and/or use cloud-based resources to perform at least some of the tasks described herein.

Figure 2:
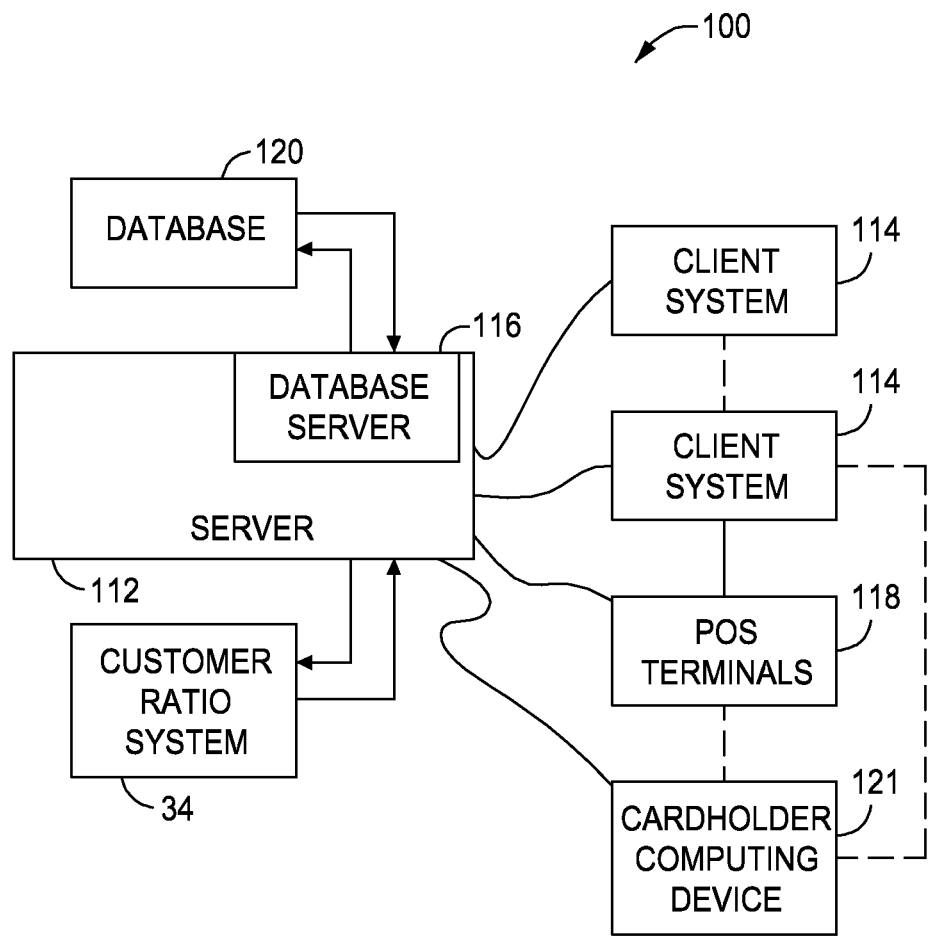

FIG. 2 is a simplified block diagram of an example processing system 100 including a plurality of computer devices in accordance with one embodiment of the present disclosure. In the example embodiment, system 100 may be used for performing payment-by-card transactions and/or determining number of customers at a location in relation to a number of visitors determined at that location. For example, system 100 may receive information from user handheld devices, such as cell phones that transmit a radio message seeking connection to a cell tower, Wi-Fi access point or Bluetooth transceiver, capture a unique identifier of the handheld device from the received message, determine a signal strength of the received message, determine handheld device geographic information based on the captured unique identifier and the determined signal strength, and output the handheld device information.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store visit information data handheld device unique identifiers, dwell locations and times, physical paths through the merchant location, and spend information, for processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the example embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, a biller, and/or a customer ratio system 34. Customer ratio system 34 may be associated with interchange network 28 or with an outside third party in a contractual relationship with interchange network 28. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
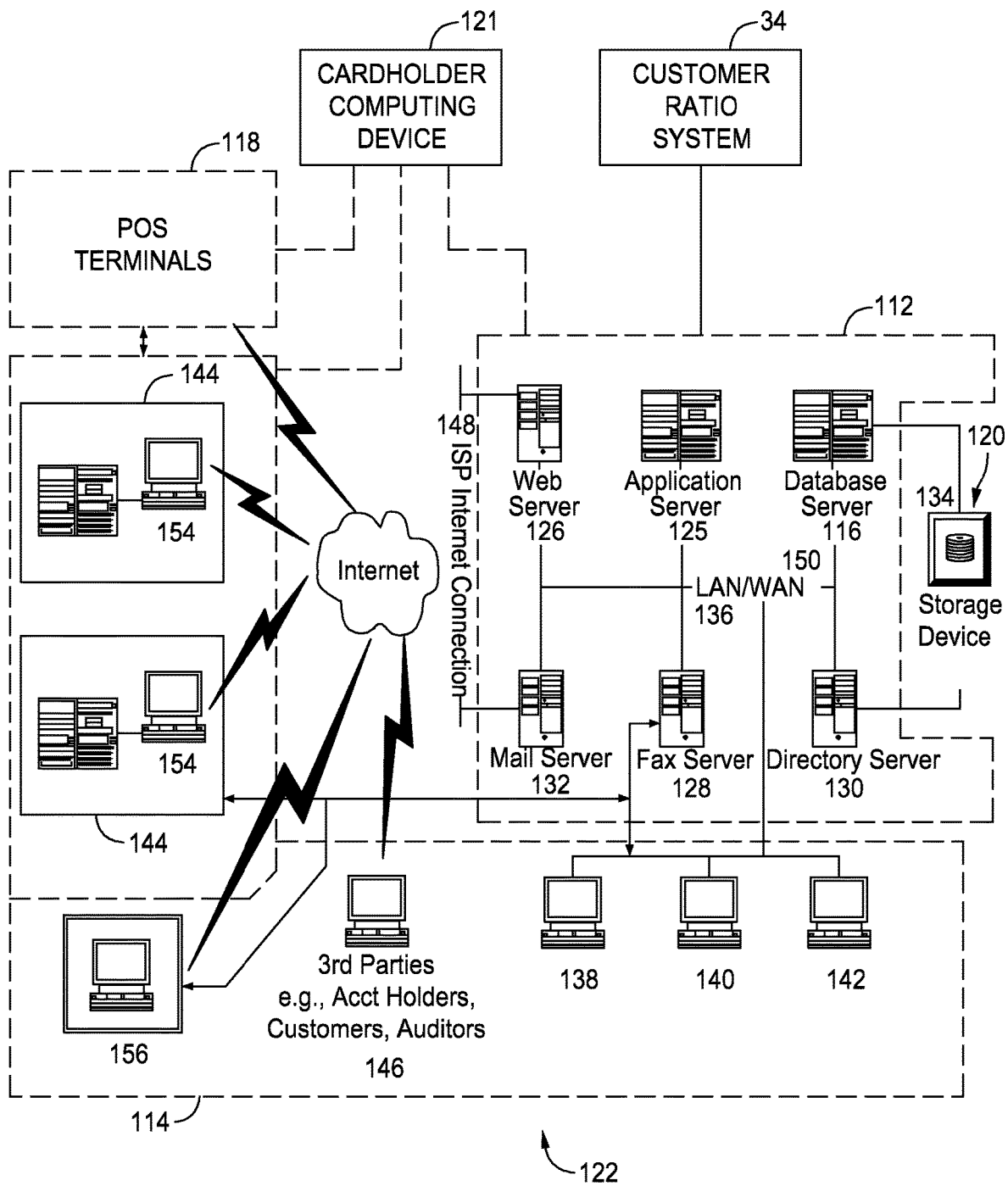

FIG. 3 is an expanded block diagram of an example embodiment of a server architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
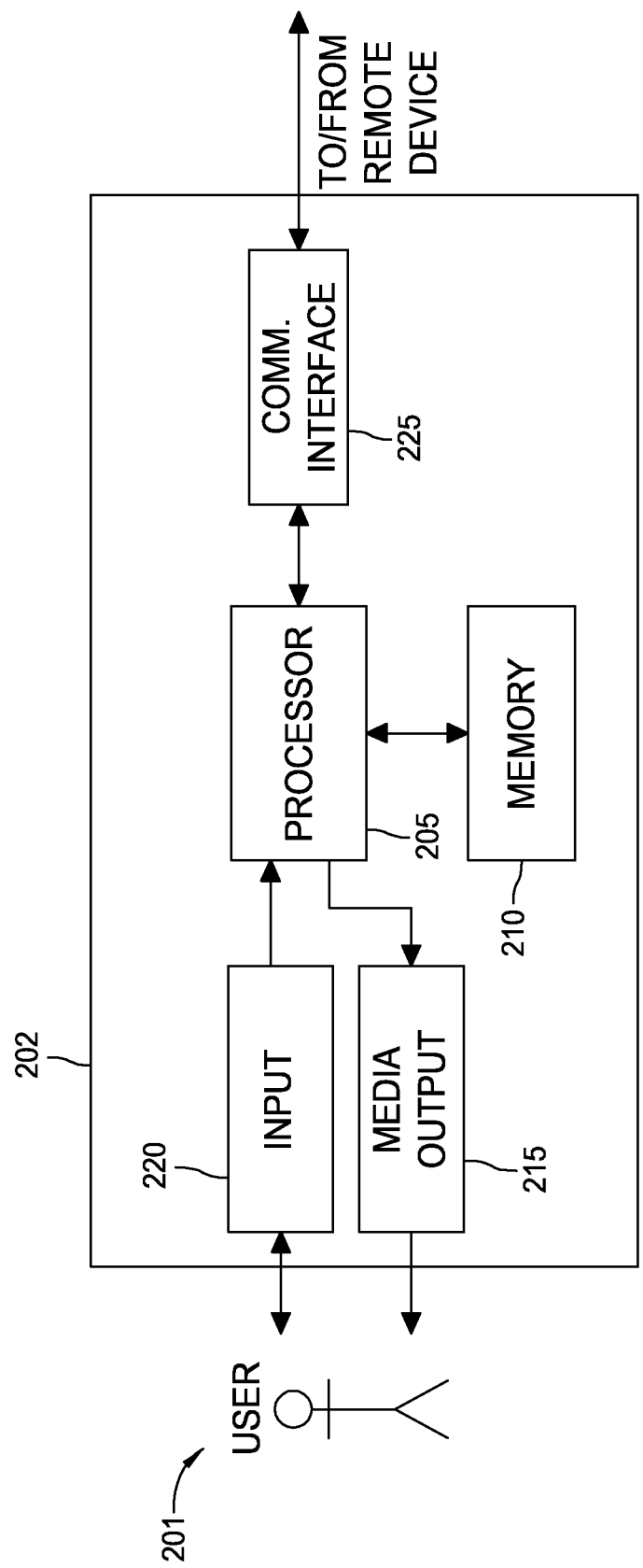

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
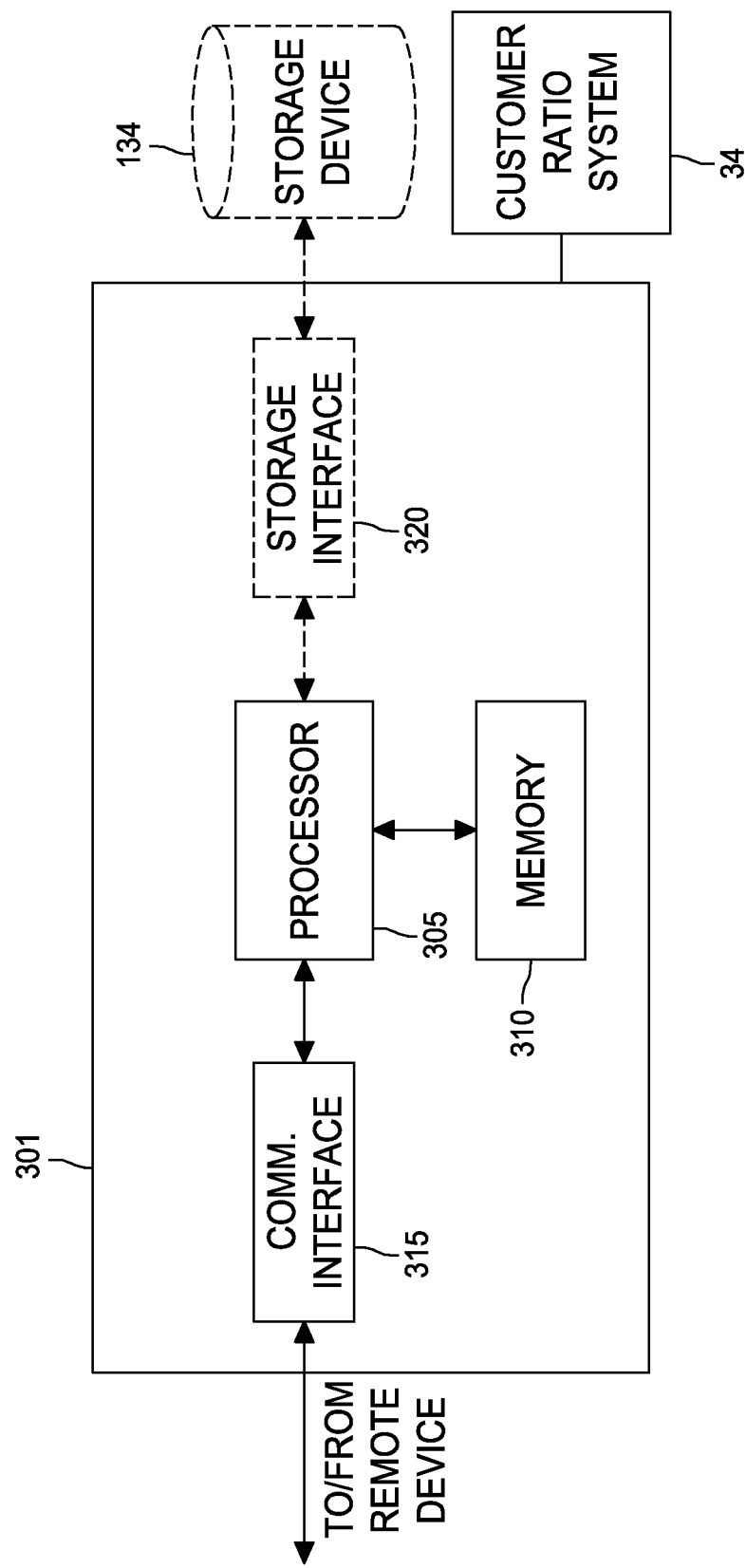

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
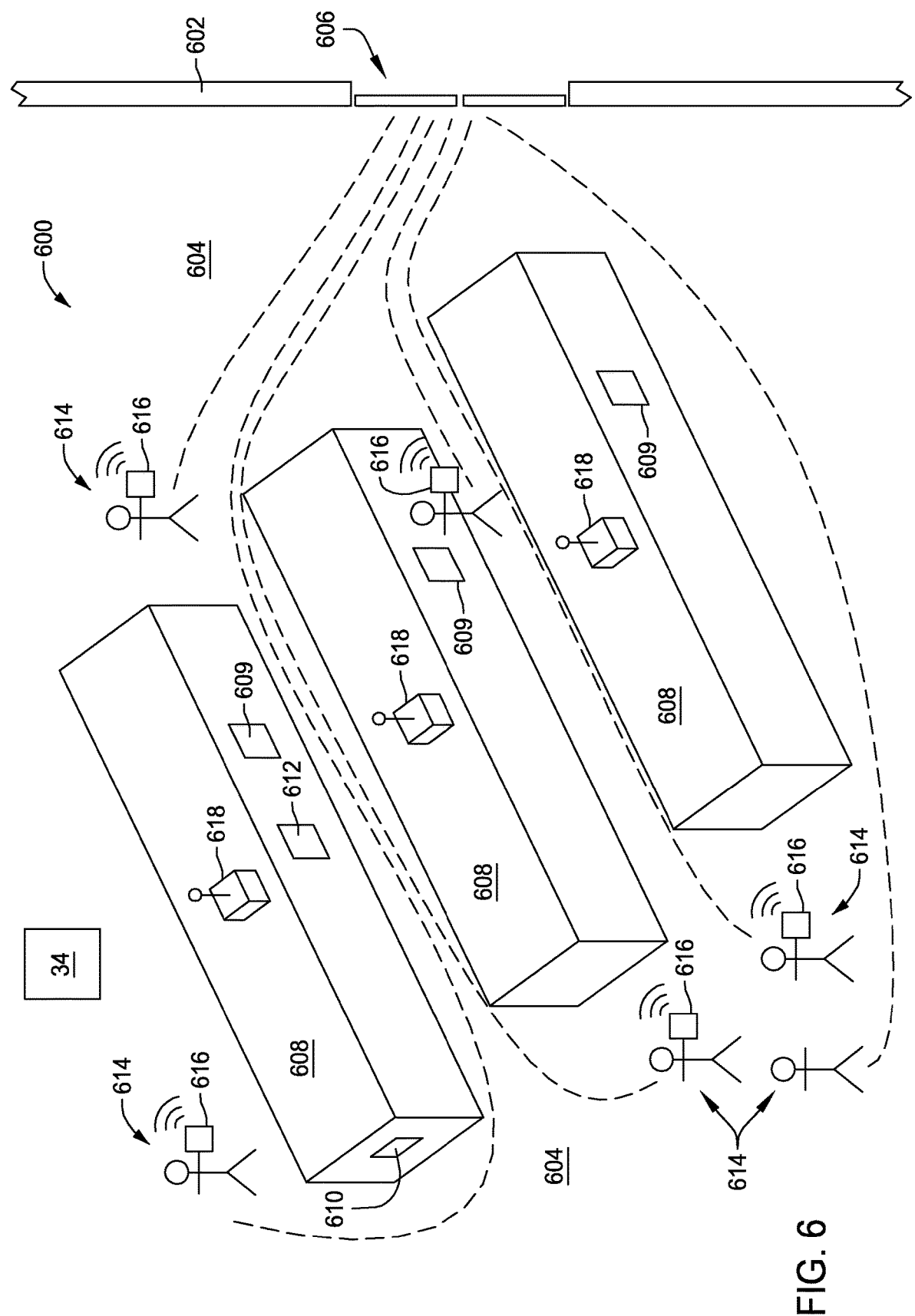

FIG. 6 illustrates a floor layout of a merchant location 600 in accordance with an example embodiment of the present disclosure. In the example embodiment, merchant location 600 includes a wall 602 circumscribing a shopping floor 604. Wall 602 includes one or more visitor access doors 606. Shopping floor 604 includes a plurality of shelving units 608 on which goods 609 for purchase are temporarily stored and displayed. Shelving units 608 may also include informational placards 610 and/or advertisements 612 to attract an attention of visitors' 614.

Visitors 614 enter merchant location 600 for various reasons and may enter singularly or in groups. Each visitor may have a handheld device 616, such as, but, not limited to, a feature phone, a smartphone, tablet, or other portable device. Handheld devices 616 are often configured to communicate to other systems through an internal antenna (not shown) coupled to an internal radio transceiver (not shown). To initiate communications handheld device 616 commands the transceiver to periodically transmit "hello" messages to interrogate scanning points or potential communication system transceivers 618 in the area of handheld device 616. The hello message may include a unique identifier associated with that handheld device 616 and that is encoded in hardware, firmware, and/or software on handheld device 616.

With transceivers 618 positioned at accurately known locations within or near merchant location 600, and communicating with a customer ratio system 34 wirelessly or through wired connections, accurate details of positions and paths of handheld devices 616 through merchant location 600 can be determined.

The details of positions and paths of handheld devices 616 through merchant location 600 can be used to facilitate determining a ratio of customers to visitors, where visitors are those that enter merchant location 600, but that do not make a purchase, and where customers are visitors that do make a purchase on that particular visit to merchant location 600. Visitors 614 may not make purchases for a variety of reasons, for example, but, not limited to, they are window-shopping, comparing prices, killing time, or accompanying another visitor. Moreover, customers may make their purchases using cash, in-store credit, debit cards, credit cards, all of which may be supplied to the customer by different companies including, four-party payment card processors and three-party payment card processors.

A challenge for merchants is to determine a ratio of customers that make purchases to visitors that may or may not make purchases. With such information a merchant can more efficiently manage the operation of merchant location 600. The merchant can schedule workers more efficiently and position them on shopping floor 604 more effectively.

Customer ratio system 34 is communicatively coupled to network 28 and receives financial transaction data relative to purchases made at merchant location 600 for time periods of interest. Customer ratio system 34 may also receive data from the merchant or other sources. For example, customer ratio system 34 may receive receipt information form the merchant that corresponds to the time periods of interest.

From this information, customer ratio system 34 can determine weighting factors relating to cash purchases and payment card purchases made using payment cards not associated with network 28.

Figure 7:
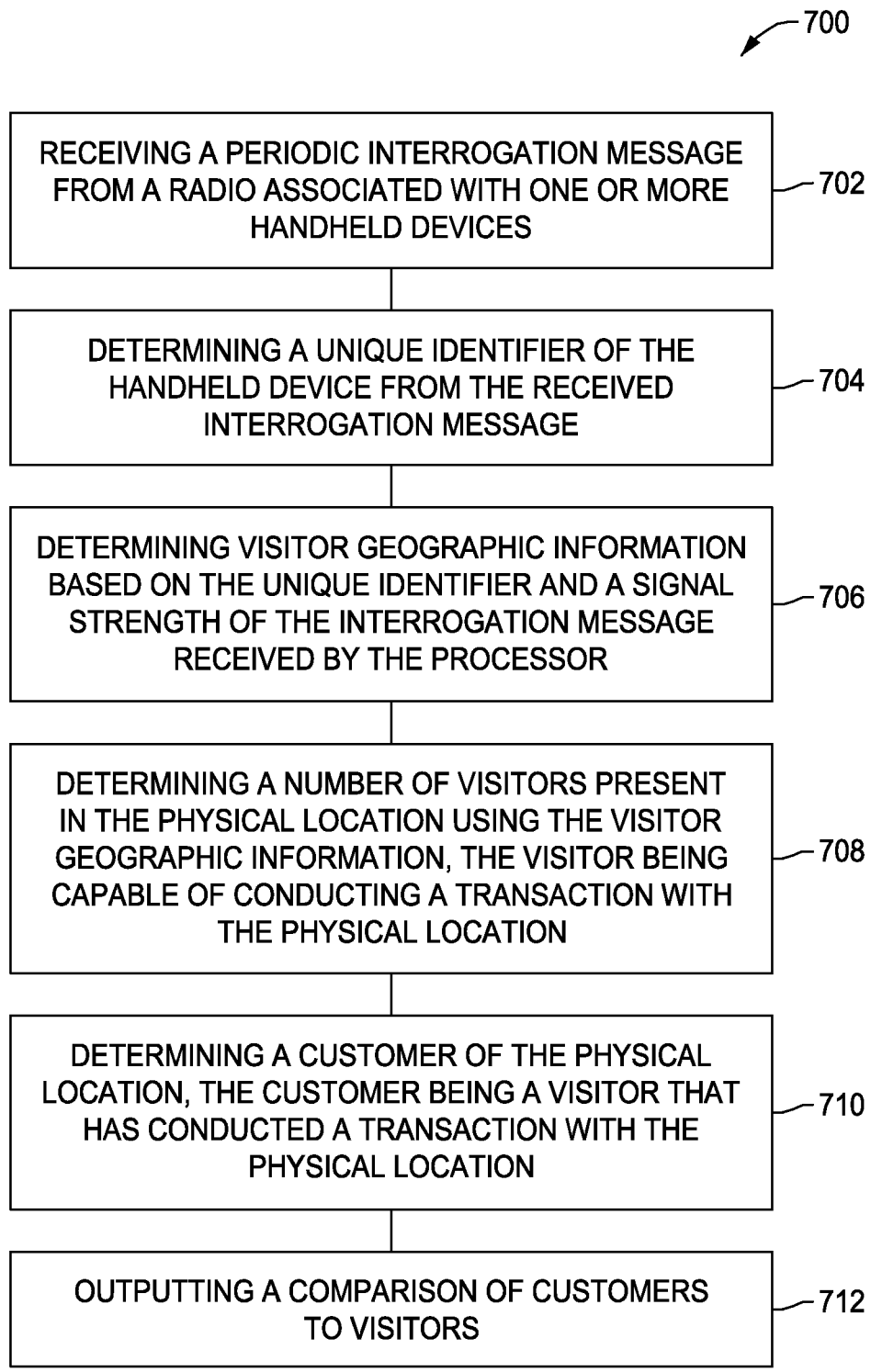

FIG. 7 is a flow diagram of a method 700 of determining a status of a visitor to a physical location and associated with a handheld device. In the example embodiment, method 700 includes receiving 702 a hello message from a radio associated with one or more handheld devices. The hello message may be received at a physical bricks and mortar merchant location while a visitor associated with the handheld device is present in the merchant location. The handheld device may be embodied in a phone, tablet device, or other wireless communication device having a radio. Method 700 also includes capturing 704 a unique identifier of the handheld device from the received hello message. The handheld device may transmit periodically a message interrogating nearby potential radios for connection. For example, phones transmit hello messages designated for cell towers to provide information to a phone company about the whereabouts of the phone so that the phone company knows where to route incoming phone calls. The phone may also attempt to access a Wi-Fi network or Bluetooth device by periodically sending messages that when received by a radio receiver communications can be initiated. The unique identifier permits message exchange between each phone separately from other phones or handheld devices in the area. Method 700 further includes determining 706 a signal strength of the received hello message or potentially a direction from the phone to a receiving antenna if the receiving antenna is directional, determining 708 visitor geographic information based on the captured unique identifier and the determined signal strength. The geographic information includes a position of the handheld device over time, a path of the handheld device through the merchant location, and a dwell time of visitors in certain areas of the merchant location. The determined visitor information is output 710 to the merchant or other entity for further processing and/or use in the operations of the merchant location.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by, for example, processors 205, 305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of determining a status of a visitor to a physical location and associated with a handheld device provides a cost-effective and reliable means of locating handheld devices in a physical area and monitor their path. More specifically, the methods and systems described herein facilitate receiving and identifying a hello interrogation message and using characteristics of the radio signal carrying the message. As a result, the methods and systems described herein facilitate efficient operation of the merchant store location in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A customer ratio computer-based method for determining a status of each visitor to a physical location, each visitor associated with a corresponding handheld device, the customer ratio computer communicatively coupled to a first network of a plurality of physical location transceivers, the customer ratio computer including a processor communicatively coupled to a memory device and a customer ratio computer transceiver, the method comprising:
  passively receiving, by the plurality of physical location transceivers, a periodic interrogation message from a radio transmitter embedded in each of a plurality of handheld devices of a second network of the plurality of handheld devices, wherein the periodic interrogation message is received in response to communications first initiated by each of the plurality handheld devices, and wherein the periodic interrogation message is configured to request a connection via radio frequency transmission to at least one of a cell tower, a Wi-Fi access point and a short-range wireless communication transceiver;
  receiving, by the processor, the periodic interrogation message from the plurality of physical location transceivers through the customer ratio computer transceiver;
  determining a unique identifier of each of the plurality of handheld devices from the received periodic interrogation message, the unique identifier including at least a Media Access Control (MAC) address;
  determining a distance between each of the plurality of handheld devices and the plurality of physical location transceivers of the first network based on the unique identifier and a signal strength of the periodic interrogation message received by each of the plurality of physical location transceivers;
  periodically determining, based on the determined distance, visitor geographic information over a respective path through the physical location of each of the plurality of handheld devices to trace a path of each visitor through the physical location;
  determining a number of visitors present in the physical location using the visitor geographic information, each visitor being capable of conducting a transaction at the physical location;
  determining that a first visitor is accompanying a second visitor by determining a proximity of each handheld device of the plurality of handheld devices to each other over a respective path of each of the plurality of handheld devices through the physical location;
  updating the number of visitors present in the physical location by counting the first visitor and the second visitor as a single visitor based on a divergence and convergence through the physical location of the paths of a respective handheld device associated with the first visitor and a respective handheld device associated with the second visitor;
  determining, for a time period of interest, a total number of customers of the physical location, each customer having conducted a transaction at the physical location, by:
    receiving, from a payment network in communication with the customer ratio computer, financial transaction data relative to purchases made at the physical location for the time period of interest;
    determining a number of customers who use the payment network; and
    applying a ratio of customers who use the payment network to customers who use other forms of payment to determine the total number of customers; and
  outputting a ratio of the total number of customers to the updated number of visitors for the time period of interest.

2. The computer-based method of claim 1, wherein determining the visitor geographic information comprises determining at least one of a dwell time of each visitor in certain positions through the physical location and a frequency of appearance at the physical location.

3. The computer-based method of claim 2, further comprising counting the plurality of handheld devices as multiple visitors based on a divergence and convergence of the paths of the plurality of handheld devices through the physical location.

4. The computer-based method of claim 2, further comprising counting at least two of the plurality of handheld devices as a single visitor when the paths of a respective path of each of the at least two of the plurality of handheld devices are non-divergent over an entire path through the physical location.

5. The computer-based method of claim 2, further comprising counting the plurality of handheld devices as more than one visitor when the paths of the plurality of handheld devices are divergent at least once over the path through the physical location.

6. The computer-based method of claim 1, wherein determining a customer of the physical location comprises comparing the visitor geographic information of each visitor to a time of a transaction.

7. The computer-based method of claim 6, further comprising counting each visitor as a customer when the visitor geographic information indicates that each visitor is proximate a place of a transaction at approximately the time of the transaction.

8. The computer-based method of claim 1, wherein determining the unique identifier of each of the plurality of handheld devices comprises further determining at least one of a Received Signal Strength Indicator (RSSI), Class of Device (CoD), and Vendor identification from the received interrogation message.

9. The computer-based method of claim 8, further comprising determining a distance between each of the plurality of handheld devices and a scanning point using the RSSI.

10. A customer ratio system for determining a status of each visitor to a physical location, each visitor associated with a corresponding handheld device, the customer ratio system comprising a first network of one or more physical location transceivers, a memory device and a processor in communication with the memory device, the customer ratio system programmed to:
 passively receive a periodically transmitted interrogation message from a radio transmitter embedded in each of a plurality of handheld devices of a second network of the plurality of handheld devices present in the physical location, wherein the interrogation message is received in response to communications first initiated by each of the plurality of handheld devices, and wherein the interrogation message is configured to request a connection via radio frequency transmission to at least one of a cell tower, a Wi-Fi access point, and a short-range wireless communication transceiver;
 determine a unique identification number associated with each of the plurality of handheld devices based on the received interrogation message, the unique identifier including at least a Media Access Control (MAC) address;
 determine a distance between each of the plurality of handheld devices and the plurality of physical location transceivers of the first network based on the unique identifier and a signal strength of the periodic interrogation message received by each of the plurality of physical location transceivers;
 determine, based on the determine distance, visitor geographic information over a respective path through the physical location of each of the plurality of handheld devices to trace a path of each visitor through the physical location;
 determine a number of visitors present in the physical location using the visitor geographic information, each visitor being capable of conducting a transaction at the physical location;
 determine that a first visitor is accompanying a second visitor by determining a proximity of each of the plurality of handheld devices to each other over a respective path of each of the plurality of handheld devices through the physical location;
 update the number of visitors present in the physical location by counting the first visitor and the second visitor as a single visitor based on a divergence and convergence through the physical location of the paths of a respective handheld device associated with the first visitor and a respective handheld device associated with the second visitor;
 determine, for a time period of interest, a total number of customers of the predetermined location, each customer having conducted a transaction at the physical location, by:
  receiving, from a payment network in communication with the customer ratio system, financial transaction data relative to purchases made at the physical location for the time period of interest;
  determining a number of customers who use the payment network; and
  applying a ratio of customers who use the payment network to customers who use other forms of payment to determine the total number of customers; and
 output a ratio of the total number of customers to the updated number of visitors for the time period of interest.

11. The customer ratio system of claim 10, wherein said customer ratio system is programmed to determine the visitor geographic information using a direction of each of the plurality of handheld devices from a directional antenna.

12. The customer ratio system of claim 10, wherein said customer ratio system is programmed to:
 correlate the visitor geographic information with the financial transaction data; and
 determine, based at least on the correlation, a ratio of customers that make a purchase at the physical location to visitors present in the physical location that do not make a purchase at the physical location.

13. The customer ratio system of claim 10, wherein said customer ratio system is programmed to estimate a portion of the plurality of handheld devices in the physical location that are broadcasting the interrogation message.

14. The customer ratio system of claim 10, wherein said customer ratio system is programmed to estimate a portion of the plurality of handheld devices associated with purchases made using a particular one of a plurality of payment cards or cash.

15. One or more non-transitory computer-readable storage media having computer-executable instructions embodied thereon for determining a status of each visitor to a physical location, each visitor associated with a corresponding handheld device, wherein when executed by at least one processor of a customer ratio computer, the computer-executable instructions cause the processor to:
 passively receive, by one or more physical location transceivers of a first network, an interrogation message from a radio transmitter embedded in each of a plurality of handheld devices of a second network present in the physical location, wherein the interrogation message is received in response to communications first initiated by each of the plurality of handheld devices, and wherein the interrogation message is configured to request a connection via radio frequency transmission to at least one of a cell tower, a Wi-Fi access point, and a short-range wireless communication transceiver;
 determine a unique identification number associated with each of the plurality of handheld devices based on the received interrogation message, the unique identifier including at least a Media Access Control (MAC) address;
 determine a distance between each of the plurality of handheld devices and the plurality of physical location transceivers of the first network based on the unique identifier and a signal strength of the periodic interrogation message received by each of the plurality of physical location transceivers;
 periodically determine, based on the determined distance, visitor geographic information over a respective path through the physical location of each of the plurality of handheld devices to trace a path of each visitor through the physical location;

determine a number of visitors present in the physical location using the visitor geographic information, each visitor being capable of conducting a transaction at the physical location;

determine a first visitor is accompanying a second visitor by determining a proximity of each of the plurality of handheld devices to each other over a respective path of the plurality of handheld devices through the physical location;

update the number of visitors present in the physical location by counting the first visitor and the second visitor as a single visitor based on a divergence and convergence through the physical location of the paths of a respective handheld device associated with the first visitor and a respective handheld device associated with the second visitor;

determine, for a time period of interest, a total number of customers that make a purchase at the physical location by:

receiving, from a payment network in communication with the customer ratio computer, financial transaction data relative to purchases made at the physical location for the time period of interest;

determining a number of customers who use the payment network; and applying a ratio of customers who use the payment network to customers who use other forms of payment to determine the total number of customers; and output a ratio of the total number of customers to the updated number of visitors for the time period of interest.

16. The computer-readable storage media of claim 15, wherein the computer-executable instructions further cause the processor to:

correlate the visitor geographic information with the retrieved financial transaction data; and determine, based at least on the correlation, the ratio of customers that make a purchase at the physical location to visitors present in the physical location that do not make a purchase at the predetermined location.

17. The computer-readable storage media of claim 15, wherein the computer-executable instructions further cause the processor to estimate a portion of the plurality of handheld devices in the physical location that are broadcasting the interrogation message.

\* \* \* \* \*